(12) United States Patent
Ellis et al.

(10) Patent No.: US 9,518,816 B2
(45) Date of Patent: Dec. 13, 2016

(54) DUAL BEAM SPLITTER INTERFEROMETER MEASURING 3 DEGREES OF FREEDOM, SYSTEM AND METHOD OF USE

(71) Applicants: Jonathan D. Ellis, Rochester, NY (US); Josephus Wilhelmus Spronck, Delft (NL)

(72) Inventors: Jonathan D. Ellis, Rochester, NY (US); Josephus Wilhelmus Spronck, Delft (NL)

(73) Assignees: University of Rochester, Rochester, NY (US); Delft University of Technology, Delft (NL)

( * ) Notice: Subject to any disclaimer, the term of this patent is extended or adjusted under 35 U.S.C. 154(b) by 219 days.

(21) Appl. No.: 14/361,106

(22) PCT Filed: Nov. 29, 2012

(86) PCT No.: PCT/US2012/066995
§ 371 (c)(1),
(2) Date: May 28, 2014

(87) PCT Pub. No.: WO2013/082247
PCT Pub. Date: Jun. 6, 2013

(65) Prior Publication Data
US 2015/0103356 A1    Apr. 16, 2015

Related U.S. Application Data

(60) Provisional application No. 61/565,848, filed on Dec. 1, 2011.

(51) Int. Cl.
*G01B 9/02*        (2006.01)
*G01B 11/14*       (2006.01)

(52) U.S. Cl.
CPC ......... *G01B 9/0207* (2013.01); *G01B 9/02003* (2013.01); *G01B 9/02015* (2013.01);
(Continued)

(58) Field of Classification Search
CPC .............. G01B 9/0207; G01B 9/02015; G01B 9/02003; G01B 9/02059; G01B 11/14; G01B 2290/60; G01B 2290/45
See application file for complete search history.

(56) References Cited

U.S. PATENT DOCUMENTS 4,005,936 A * 2/1977 Redman ............. G01B 9/02007
356/4.1
4,789,219 A    12/1988 Layne
(Continued)

FOREIGN PATENT DOCUMENTS

JP        61034403        2/1986

OTHER PUBLICATIONS

Mitsuri Tanaka, Tohru Yamagami, and Kan Nakayama, "Linear Interpolation of Periodic Error in a Heterodyne Laser Interferometer at Subnanometer Levels," IEEE Transactions on Instrumentation & Measurement, vol. 38, No. 2, Apr. 1989, pp. 552-554.
(Continued)

*Primary Examiner* — Hwa Lee
(74) *Attorney, Agent, or Firm* — Joseph M. Noto; Bond, Schoeneck & King PLLC

(57) ABSTRACT

A compact, balanced, up to three degrees of freedom measuring interferometer having dual beam splitters rotated ninety degrees with respect to each other and a measurement detector including a quadrant detector or multi-core fiber with four detectors which enables fiber delivery of an optical source without periodic error, an interferometer system, and method for using is disclosed.

19 Claims, 11 Drawing Sheets

(52) U.S. Cl.
CPC .......... *G01B 9/02059* (2013.01); *G01B 11/14* (2013.01); *G01B 2290/45* (2013.01); *G01B 2290/60* (2013.01)

(56) References Cited

U.S. PATENT DOCUMENTS

| | | | | |
|---|---|---|---|---|
| 5,521,704 A * | 5/1996 | Thiel | ............... | G01B 9/02004 356/486 |
| 5,781,295 A * | 7/1998 | Fuchs | ............... | G01B 9/02004 356/482 |
| 6,710,880 B1 * | 3/2004 | Zhao | ............... | G01B 9/02007 356/486 |
| 7,880,894 B2 * | 2/2011 | Hirata | ............... | G01H 9/00 356/486 |
| 2003/0223674 A1 | 12/2003 | Bell, Jr. et al. | | |
| 2013/0100458 A1 * | 4/2013 | Yamada | ............... | G01B 9/02007 356/489 |

OTHER PUBLICATIONS

John Lawall and Ernest Kessler, "Michelson Interferometry with 10 pm Accuracy," Review of Scientific Instruments, vol. 71, No. 7, Jul. 2000, pp. 2669-2676.

Thilo Schuldt, Martin Gohlke, Dennis Weise, Ulrich Johann, Achim Peters and Claus Braxmaier, "Picometer and Nanoradian Optical Heterodyne Interferometry for Translation and Tilt Metrology of the LISA Gravitational Reference Center," Classical and Quantum Gravity, 26 (2009) 085008, pp. 1-12.

* cited by examiner

DUAL BEAM SPLITTER INTERFEROMETER MEASURING 3 DEGREES OF FREEDOM, SYSTEM AND METHOD OF USE

CROSS REFERENCE TO RELATED APPLICATION

This application claims benefit of U.S. Provisional Patent Application No. 61/565,848, which is hereby incorporated by reference in its entirety.

FIELD

The present disclosure relates to an interferometer, and in particular, a balanced, periodic error free, up to three degrees of freedom measuring interferometer, interferometer system, and method of use.

BACKGROUND

Typical interferometer systems require a large footprint on the target to measure a single axis of displacement. To measure displacement and two rotational degrees of freedom, three identical interferometer systems are typically needed by the prior art. This greatly increases cost and makes the overall footprint of the interferometer very large. Standard displacement interferometer systems also typically manipulate the polarization states of the optical beams with both the reference and measurement arms in the interferometer with several overlapping instances prior to the final interfering surface. This leads to the measurement of nonlinearity as a function of target position, commonly called periodic nonlinearity. This results from using a heterodyne source with nominally orthogonally polarized, collinear optical beams that suffer from imperfect optics and imperfect alignment. Optical symmetry is typically maintained between measurement and reference arms by having a complex optical path through numerous optical components. This increases susceptibility to thermal gradients and requires more costly optical components to address these deficiencies.

The art lacks a balanced, periodic error free, three degrees of freedom measuring interferometer.

SUMMARY

The present interferometer system is capable of measuring the displacement and two rotational degrees of freedom in a much smaller system than that of the prior art since one optical beam is sent to the target mirror. Simultaneously measuring the interference wavefront at several separated points and comparing the measurement interference phase changes to a known optical reference can be used to measure the displacement and changes in the two rotational degrees of freedom of the measurement target. The present system uses a spatially separated source in a balanced optical configuration to enable a compact interferometer, with no optical overlap prior to the main interference surfaces, eliminating periodic error in the measurement.

An aspect of the present invention relates to an interferometer including: a first beam splitter capable of splitting a first light beam having a first frequency to a reference detector, a measurement detector, and a reference mirror, wherein the first light beam is transmitted through the first beam splitter to the reference mirror and reflected back to the first beam splitter along the same path; a second beam splitter capable of splitting a second light beam having a second frequency to the reference detector, the measurement detector, and a measurement mirror, wherein the second light beam is transmitted through the second beam splitter to the measurement mirror and reflected back to the second beam splitter along the same path, and wherein the first light beam is spatially separated from the second light beam, the first and second frequencies having nominally different frequencies, and the path of the first light beam through the first beam splitter is the same length as the path of the second light beam through the second beam splitter; and wherein the path of the first light beam transmitted from the first beam splitter to the reference detector is in the path of the second light beam transmitted from the second beam splitter to the reference detector such that a reference interference signal is generated and can be detected at the reference detector and the path of the second light beam transmitted from the second beam splitter to the measurement detector is in the path of the first light beam transmitted from the first beam splitter to the measurement detector such that a measurement interference signal is generated and can be detected at the measurement detector.

Another aspect of the present invention relates to an interferometer system including the interferometer noted above and a light source including a light beam separated by a beam splitter into two spatially separated beam paths, each beam path transmitted to a separate acousto-optic modulator, each acousto-optic modulator driven at nominally different frequency outputs and launched into respective optical fibers in optical communication with the interferometer.

Another aspect of the present invention relates to a method of using an interferometer to measure a target moved from a first position to a second position, including directing a first light beam having a first frequency to a first beam splitter and splitting the first light beam to a reference detector, a measurement detector, and a reference mirror; transmitting the first light beam through the first beam splitter to the reference mirror and reflecting back to the first beam splitter along the same path; directing a second light beam having a second frequency to a second beam splitter and splitting the second light beam to the reference detector, the measurement detector, and a measurement mirror of a target in a first position; transmitting the second light beam through the second beam splitter to the measurement mirror and reflecting back to the second beam splitter along the same path, wherein the first light beam is spatially separated from the second light beam, the first and second light beams have a different frequency, the path of the first light beam through the first beam splitter is the same length as the path of the second light beam through the second beam splitter, the path of the first light beam transmitted from the first beam splitter to the reference detector is in the path of the second light beam transmitted from the second beam splitter to the reference detector creating a reference interference signal, and the path of the second light beam transmitted from the second beam splitter to the measurement detector is in the path of the first light beam transmitted from the first beam splitter to the measurement detector creating a measurement interference signal for the measurement mirror; detecting the reference interference signal at the reference detector and the measurement interference signal at the measurement detector for the target in the first position; moving the target to a second position, detecting the reference interference signal at the reference detector and the measurement interference signal at the measurement detector for the target in the second position, and calculating the difference in at least one of the tilt, tip and displacement values of the target generated from the first and second positions.

DETAILED DESCRIPTION

Figure 1:
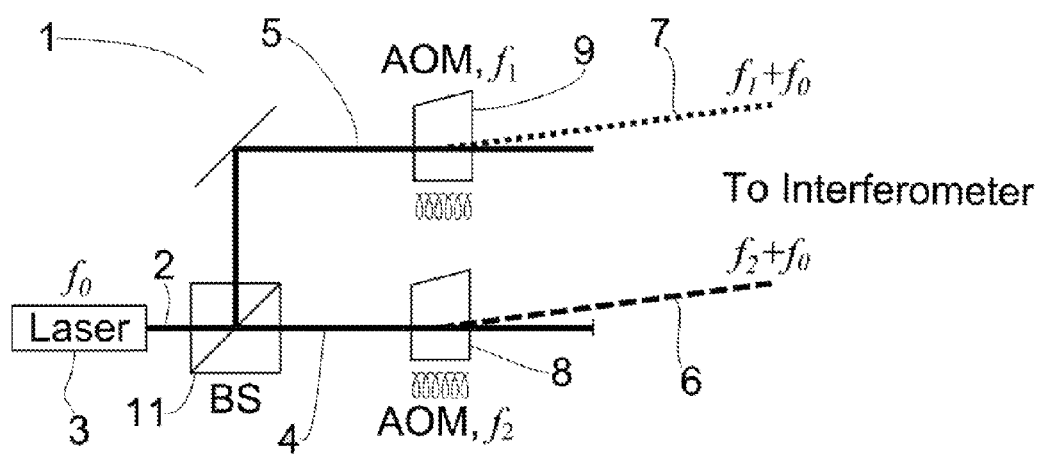
FIG. 1 is a schematic of an optical source for the interferometer system in accordance with a free space embodiment of the present invention.

The present interferometer is a balanced, compact, up to three degree of freedom measuring interferometer which enables fiber delivery of an optical source without periodic nonlinearity. The optical path between the reference and measurement beams is balanced. To ensure no periodic nonlinearity, the interferometer system includes a spatially separated optical source having two different optical frequencies, without any frequency mixing prior to interference. The present invention has several advantages over existing technologies because it can measure the simultaneous displacement and tip/tilt error of a target, which is typically mounted to a stage. This capability is very useful for high precision systems that need very accurate positioning and require a very linear motion. The present interferometer and system can be used as an embedded system to provide feedback sensing or as a calibration system to ensure precise linear motion is achieved. The present interferometer and system can also be used for measuring/calibrating small displacements, as a feedback sensor for stages, and in-process monitoring. The spatially separated source enables fiber delivery to the interferometer without inducing periodic errors and detection can take place back through the delivery fibers or via fiber coupled detectors, enabling embedded applications (as shown in FIGS. 7-11). This has applications in embedded and remote sensing, particularly for measuring the displacement of systems in an enclosure such as an environmental chamber or vacuum chamber. Fiber delivery to the interferometer and fiber detection from the interferometer makes the interferometer insensitive to electromagnetic disturbances. Also, since polarization components are not required for operation, this enables further immunity from errors for applications which have a high level of electromagnetic disturbance.

Unlike other interferometer systems, the present invention uses a single optical beam to the target, while measuring displacement and up to two rotational errors. The present system is very useful because it allows operation on a very small target, preferably, on the order of a few square millimeters. This enhances performance of the system by avoiding having the target contribute too much mass to the target system or stage. The present interferometer contains few components, unlike traditional interferometers, which reduces the interferometer size and footprint.

The interferometer system of the present invention includes an optical source and an interferometer. Preferably, the optical source is a spatially separated source. While a spatially separated source is optional, it is preferred because it eliminates frequency mixing, which can cause errors on the nanometer scale. Standard heterodyne laser sources with collinear, orthogonally polarized output beams can be used but the source mixing may contribute to periodic errors, limiting measurement accuracy. A source providing two optical beams having the same polarization and a relatively stable and known frequency difference is preferred.

Figure 2:
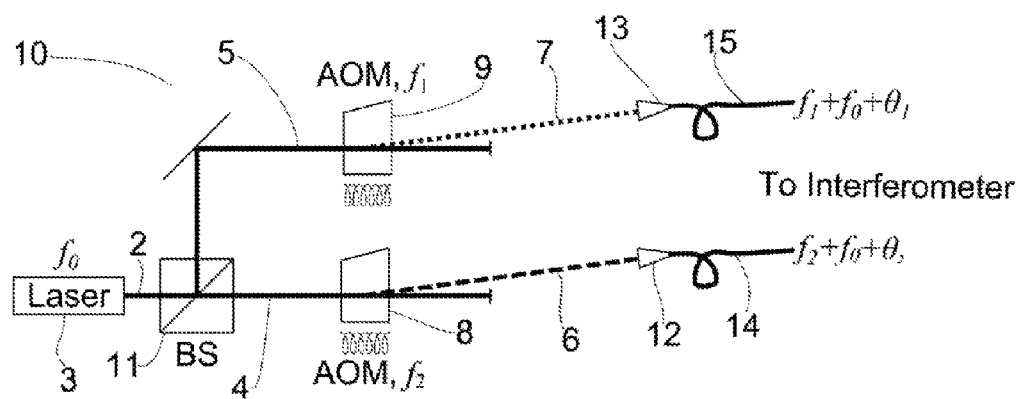
FIG. 2 is a schematic of an optical source for the interferometer system in accordance with a fiber embodiment of the present invention.

Suitable optical sources for the interferometer of the present invention include an embodiment of a free space 1 optical source, as shown in FIG. 1, and an embodiment of a fiber 10 optical source, as shown in FIG. 2. As shown in FIGS. 1 and 2, a single frequency 2, designated $f_0$, from a stabilized optical source 3, preferably a laser, is split into two separate beam paths 4 and 5 by a beam splitter (BS) 11. The two optical frequencies 6 and 7 can be generated via two acousto-optic modulators (AOMs) 8 and 9, driven at slightly different frequencies. Preferably, the positive first order diffractive beams are used in the interferometer, but other combinations are possible. When one AOM 9 is driven at frequency $f_0$, then for beam path 5 the first order output optical frequency 7 is $f_0+f_1$. Likewise, when the other AOM 8 is driven at frequency $f_2$, then for beam path 4 the first order output optical frequency 6 is $f_0+f_2$.

As shown in FIG. 2, each optical beam 6 and 7, having an upshifted frequency from the same stabilized source beam, single frequency 2, is launched into respective optical fibers 14 and 15 via fiber couplers 12 and 13, respectively. Preferably, optical fibers 14 and 15 are polarization maintaining when the optical source is linearly polarized and aligned to polarization maintaining fiber axis. Preferably, fiber couplers 12 and 13 are angle polished couplers which reduce spurious reflections back to the source. Both beams 6 and 7 are then coupled out of the fiber 14 and 15, respectively to the interferometer. Both fibers 14 and 15 will change length due to, for example, applied stresses and thermal variations during use. The two optical frequencies of beams 6 and 7 emitted from fibers 14 and 15 have a continuous phase change that differs based on the stress and instantaneous thermal characteristics. The two optical frequencies, including this phase component are $f_0+f_1+\theta_1$ for beam 7 and $f_0+f_2+\theta_2$ for beam 6. Respectively, $\theta_1$ and $\theta_2$ are the instantaneous phase shifts due to changing fiber path length. Since the value of $f_0$ is constant for both beams 6 and 7, then the difference in frequency between beams 6 and 7 is represented by the difference between $f_2+\theta_2$ and $f_1+\theta_1$. In the free space 1 embodiment, no fiber is employed, so $\theta_1$ and $\theta_2$ are simply constant phase offsets equal to $f_1$ and $f_2$, respectively.

Figure 3:
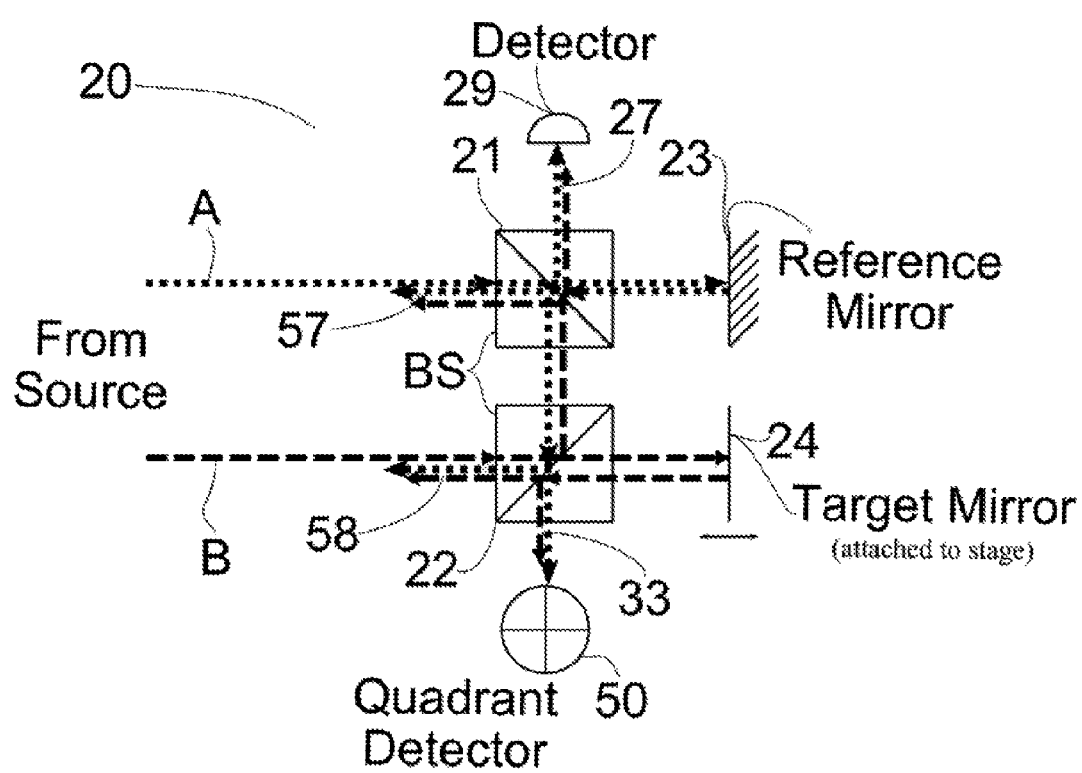
FIG. 3 is a schematic of the optical components and optical beam pathways for the interferometer in accordance with an embodiment of the present invention.
Figure 4:
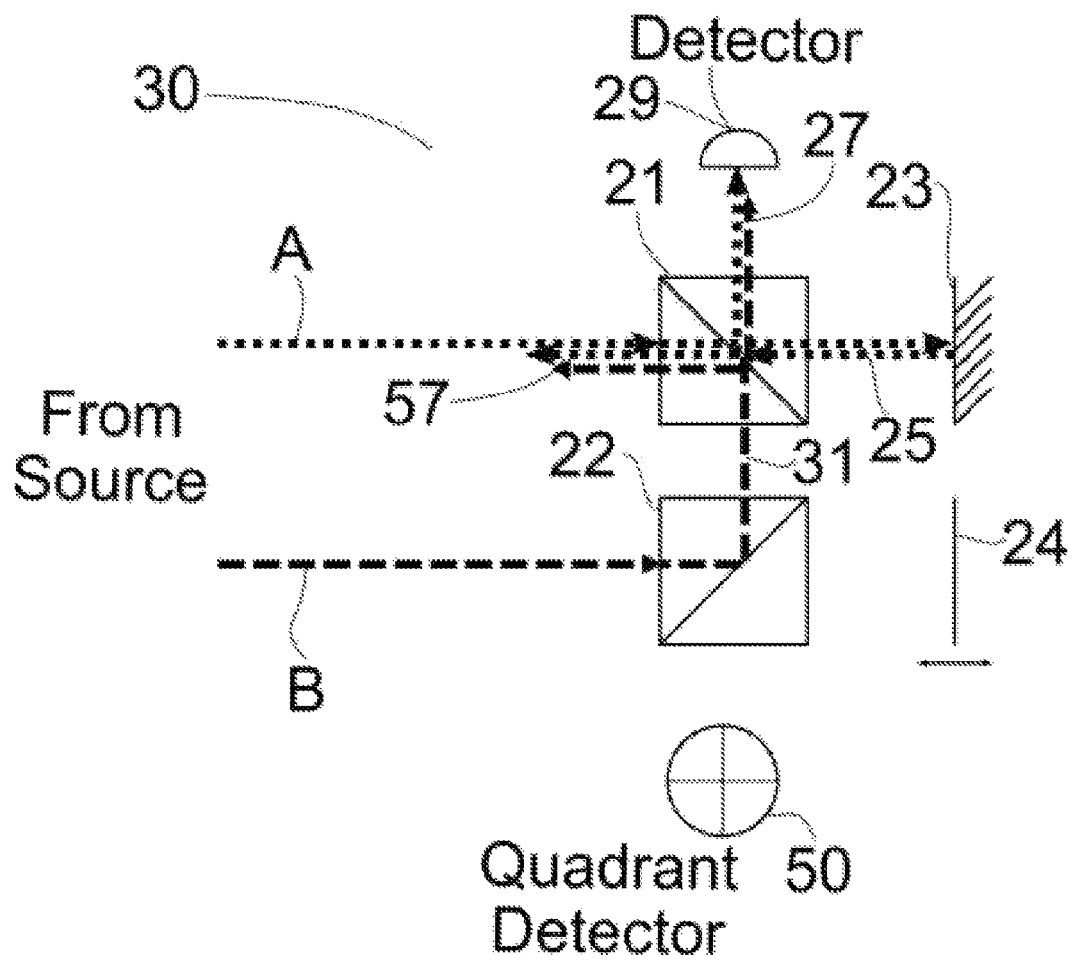
FIG. 4 is a schematic of the optical components and optical beam pathway generating the reference interference signal in accordance with an embodiment of the present invention.

The two optical source beams A and B, preferably generated from beams 7 and 6, respectively, for example as shown in FIGS. 1 and 2, typically having the same polarization and a relatively stable and known frequency difference. Optical source beams A and B are directed to the interferometer 20 of the present invention, as shown in FIG. 3. The interferometer 20 includes two beam splitters 21 and 22, preferably adjacent each other, a target or measurement mirror 24 attached to the target and a reference mirror 23 attached to a fixed reference point or to the interferometer 20. The present system preferably uses heterodyne interferometry, which typically compares a reference interference signal to a measurement interference signal to infer target displacement. Therefore, a reference interferometer 30 is capable of measuring the instantaneous frequency difference between the two optical beams A and B, as shown in FIG. 4. FIG. 4 shows the reference interferometer 30 of the interferometer 20 as shown in FIG. 3. The optical beam A transmits through the upper beam splitter 21 where a portion 25 of the beam A is split and reflects off the reference mirror 23, as shown in FIG. 4. The portion 25 of beam A is reflected back from the reference mirror 23 and partially reflects at the top of upper beam splitter 21 where it is detected by the reference detector 29, and partially transmits through the upper beam splitter 21 where it can be detected upstream in beam A (as more fully described in reference to FIG. 7). The portion 25 of beam A which is reflected from reference mirror 23 interferes with the portion 31 of beam B that is reflected from the lower beam splitter 22 and both beams are detected by the reference detector 29. Part of beam B reflected from the lower beam splitter 22 is reflected at the top of upper beam splitter 21 where another reference interference signal 57 is generated which travels upstream along the path of source beam A and which can be detected (not shown). The combined reference interference signal 27 of interfering beam portions 25 and 31 is used to calculate the nominal, instantaneous frequency difference between the two optical input beams A and B. This value, the reference interference frequency, typically ranges between a few kilohertz to hundreds of megahertz.

Figure 5:
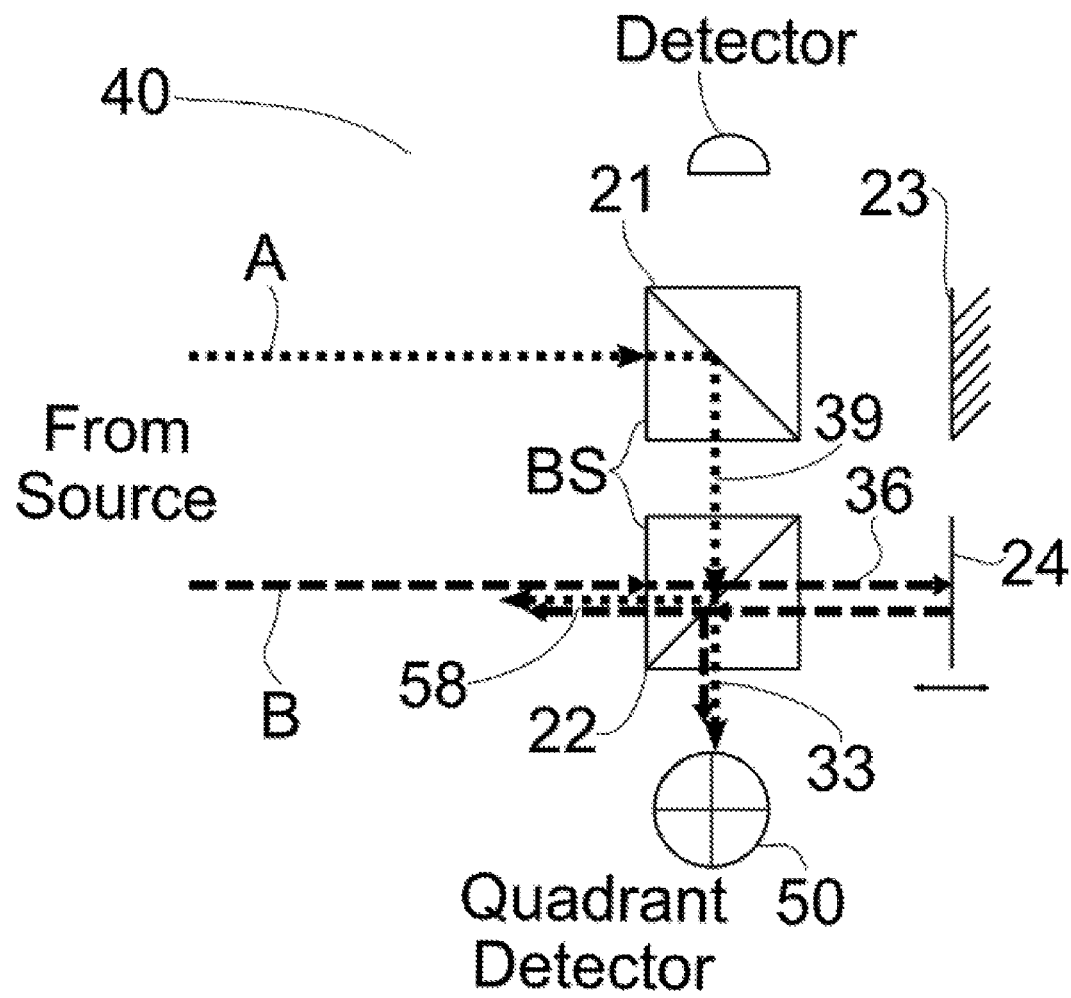
FIG. 5 is a schematic of the optical components and optical beam pathway generating the measurement interference signals in accordance with an embodiment of the present invention.

FIG. 5 shows the measurement interferometer 40 of the interferometer 20 as shown in FIG. 3. The measurement interference signal 33 is calculated as shown in FIG. 5, wherein optical beam B is split by the lower beam splitter 22 and a portion 36 of the beam B is transmitted to the target mirror 24. Portion 36 of beam B reflects back from target mirror 24 and is split by lower beam splitter 22. The reflected beam B portion 36 then interferes with the beam portion 39 of beam A that initially reflects from the upper beam splitter 21 to form measurement signal 33, which is detected by the measurement detector 50. The reflected beam B portion 36 then also interferes with the beam portion 39 of beam A that initially reflects from the upper beam splitter 21 to form measurement signal 58, which travels upstream along the path of source beam B and which can be detected (not shown).

Figure 6:
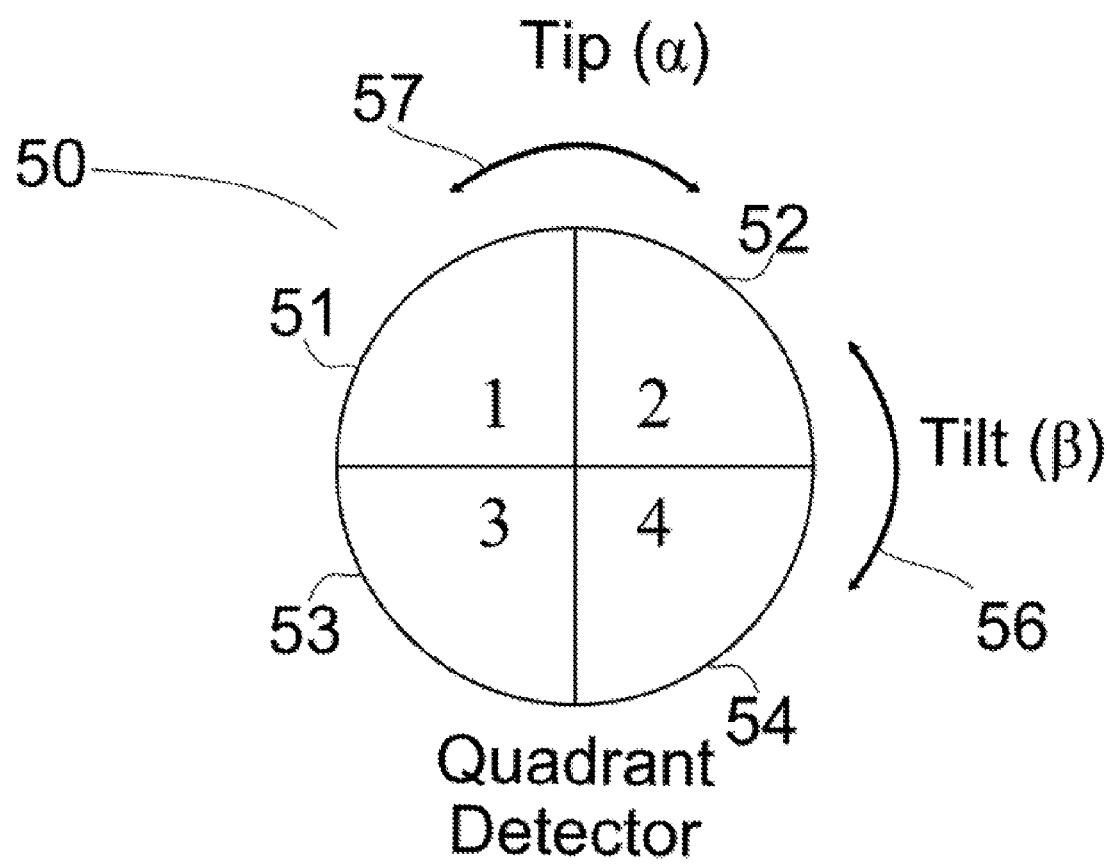
FIG. 6 is a schematic showing a quadrant detector of the interferometer in accordance with an embodiment of the present invention.

Preferably, the measurement detector 50 is a quadrant detector. The quadrant detector 50 is preferably composed of 4 photodiodes 51, 52, 53, and 54, one in each quadrant, as shown in FIG. 6. By measuring the relative signal differences between the different quadrants, the target tip 57 and tilt 56 can be measured using a known technique, such as differential wavefront sensing.

Figure 7:
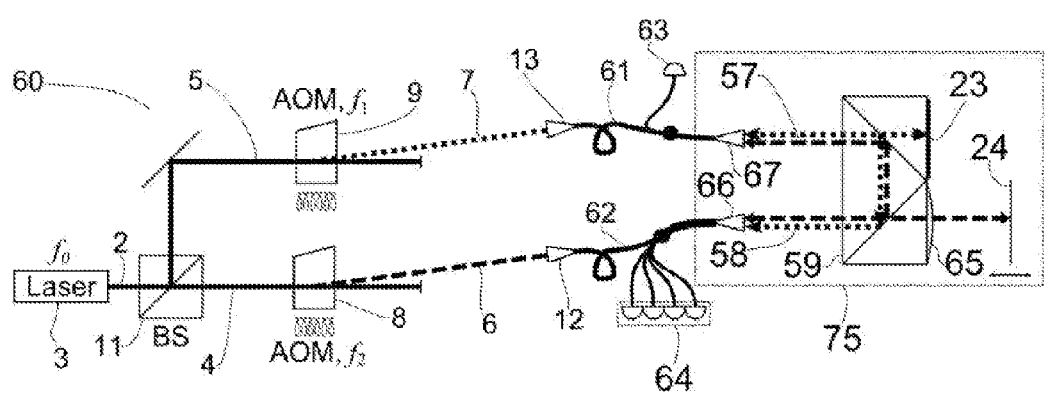
FIG. 7 is a schematic showing the fiber coupled source and interferometer system where the interferometer can be remotely located from the source with detection through the delivery fiber components.

An embodiment of a fiber coupled source and interferometer system 60, including detection along the same path as the input fibers to the interferometer 75 is shown in FIG. 7. The optical beams 6 and 7 are delivered to the interferometer 75 using fiber components, including fiber couplers 12 and 13, optical fiber with an imbedded beam splitter 61, optical fiber with multiple cores 62 typically hexagonally packed, and fiber collimators 66 and 67. A preferred fiber coupler and preferred fiber collimator include the angle-polished-connector (APC) type which reduces stray reflections in the system. The two beam splitters 21 and 22 and reference mirror 23 of FIG. 3 are combined into a signal optical beam splitting element 59 with attached reference mirror 23, as shown in FIG. 7. The reference interference signal 57 is detected back through the optical fiber with imbedded beam splitter 61 with a fiber coupled detector 63 or free space detector detached from the fiber (not shown). The measurement interference signal 58 is detected through a fiber with multiple cores 62 and sent to four fiber coupled detectors 64 or four free space detectors (not shown) to mimic the same functionality as a quadrant detector. According to this embodiment, the spacing between the differing core elements at fiber collimator 66 is used to determine the tip and tilt from the measured displacement. A lens 65 can be included in the measurement path to focus the measurement arm of the measurement interference signal on to the surface of the target mirror 24.

Figure 8:
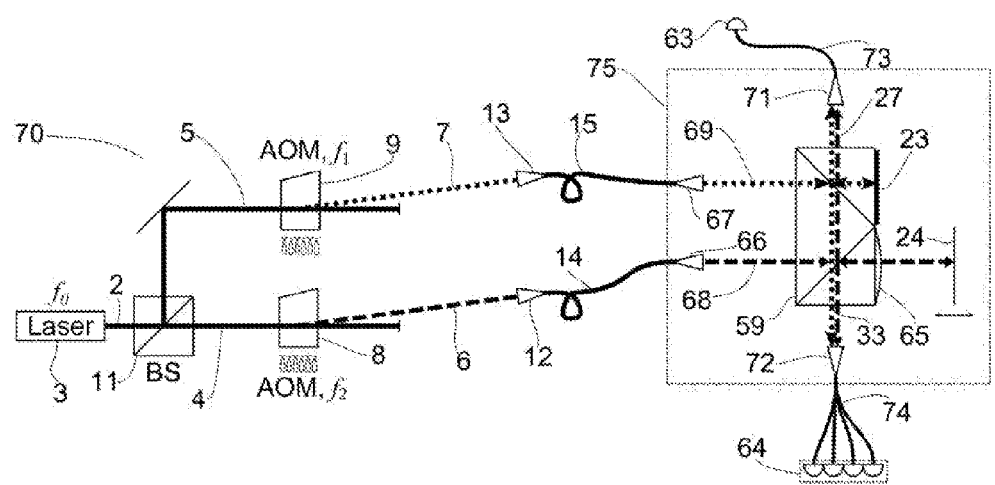
FIG. 8 is a schematic showing the fiber coupled source and interferometer system where the interferometer can be remotely located from the source with detection through fiber components that are separated from the input delivery fiber components.

An embodiment of a fiber coupled source and interferometer system 70, including fiber detection along the same path as shown in FIG. 3, is shown in FIG. 8. The interferometer 75 can be remotely located depending on the length of the fiber components 14, 15, 73, and 74. The reference interference signal 27 is launched into a fiber coupler 71, transmitted down an optical fiber 73, typically allowing multiple modes, a single mode, polarized modes, or is constructed of a gradient index material. The reference interference signal 27 is then detected using a fiber coupled detector 63 or free space detector (not shown). The measurement interference signal 33 is coupled into a multicore fiber 74 using fiber coupler 72 and detected with four separate fiber coupled detectors 64 or four free space detectors (not shown). The multicore optical fiber 74 can allow multiple modes, a single mode, polarized modes, or is constructed of a gradient index material in each core. Typically the core is in a hexagonally packed arrangement and the spacing of the cores at the interface with fiber coupler 72 is used to determine tip and tilt, along with the measured displacement from the detected measurement interference signal 33 using the four fiber coupled detectors 64.

Figure 9:
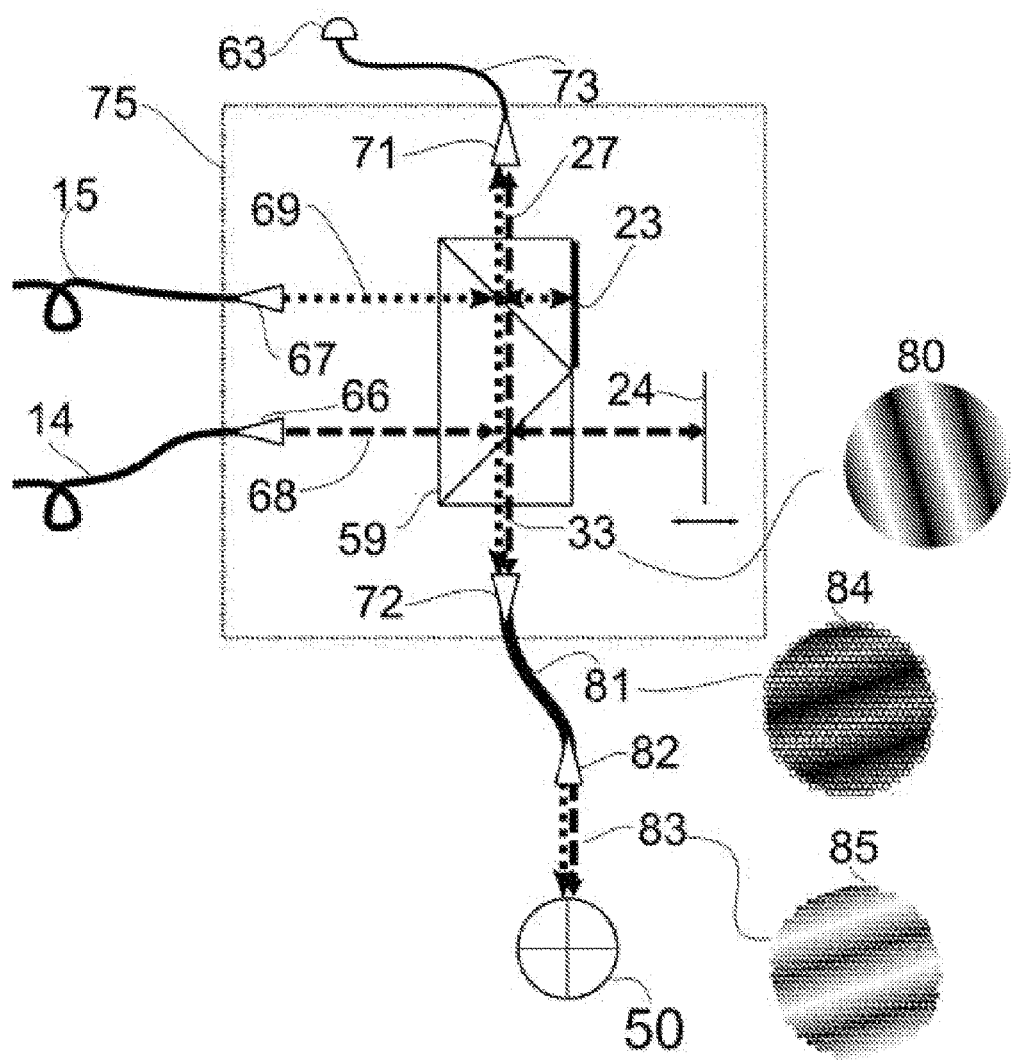
FIG. 9 is a schematic showing the fiber-delivered and fiber-detected interferometer where the differential wavefront sensing detection is made through a fiber bundle where the fiber bundle transmits the wavefront information that can be measured remotely.

An example of a fiber coupled system 75, including fiber detection along a separate path as shown in FIG. 8, is shown in FIG. 9. FIG. 9 is a schematic showing a fiber-delivered and fiber-detected interferometer embodiment where the differential wavefront sensing detection is made through a fiber bundle where the fiber bundle transmits the wavefront information that can be measured remotely. The interferometer 75 can be remotely located depending on the length of the fiber components 14, 15, 73, and 81. The reference interference signal 27 is launched into a fiber coupler 71, transmitted through an optical fiber 73, typically allowing multiple modes, a single mode, polarized modes, or is constructed of a gradient index material. The reference interference signal 27 is then detected using a fiber coupled detector 63 or free space detector (not shown). The measurement interference signal 33 is coupled into a fiber bundle 81 using fiber coupler 72 and out coupled using a fiber collimator 82 and is detected with a quadrant detector 50. The angular orientation between the two beams forming the measurement interference signal 33 results in a beam with a wavefront image 80 having an angular orientation which depends on the angular orientation of the two component beams. The measurement interference signal 33 having the wavefront image 80 is transmitted through the fiber coupler 72 into the fiber bundle 81 and reconstructed after the fiber collimator 82 into the measurement interference signal 83 having a wavefront image 85 at an arbitrary rotation. The fiber bundle 81 has many individual fibers that do not move within the fiber bundle, thus the measurement interference signal 33 having the wavefront image 80 can be seen in a cross-section of the fiber bundle 81 as a wavefront image 84 at an arbitrary rotation. The angular orientation of the fiber bundle 81 and fiber collimator 82 can be rotated azimuthally and calibrated to produce a measurement interference signal 83 having a wavefront image 85 with the same orientation as the wavefront image 80 of the measurement interference signal 33. The wavefront image 84 is shown as a cross-section of the numerous fibers present within the fiber bundle 81. When the wavefront image 84 is collimated from the fiber bundle 81 through the fiber collimator 82, the resulting wavefront image 85 of the measurement interference signal 83 has insignificant spacings between smaller, individual images transmitted through the individual fibers constituting the fiber bundle 81. The measurement interference signal 83 with wavefront image 85 is detected by the quadrant detector 50 as if the light was detected in free space and did not propagate through the fiber bundle 81.

Figure 10:
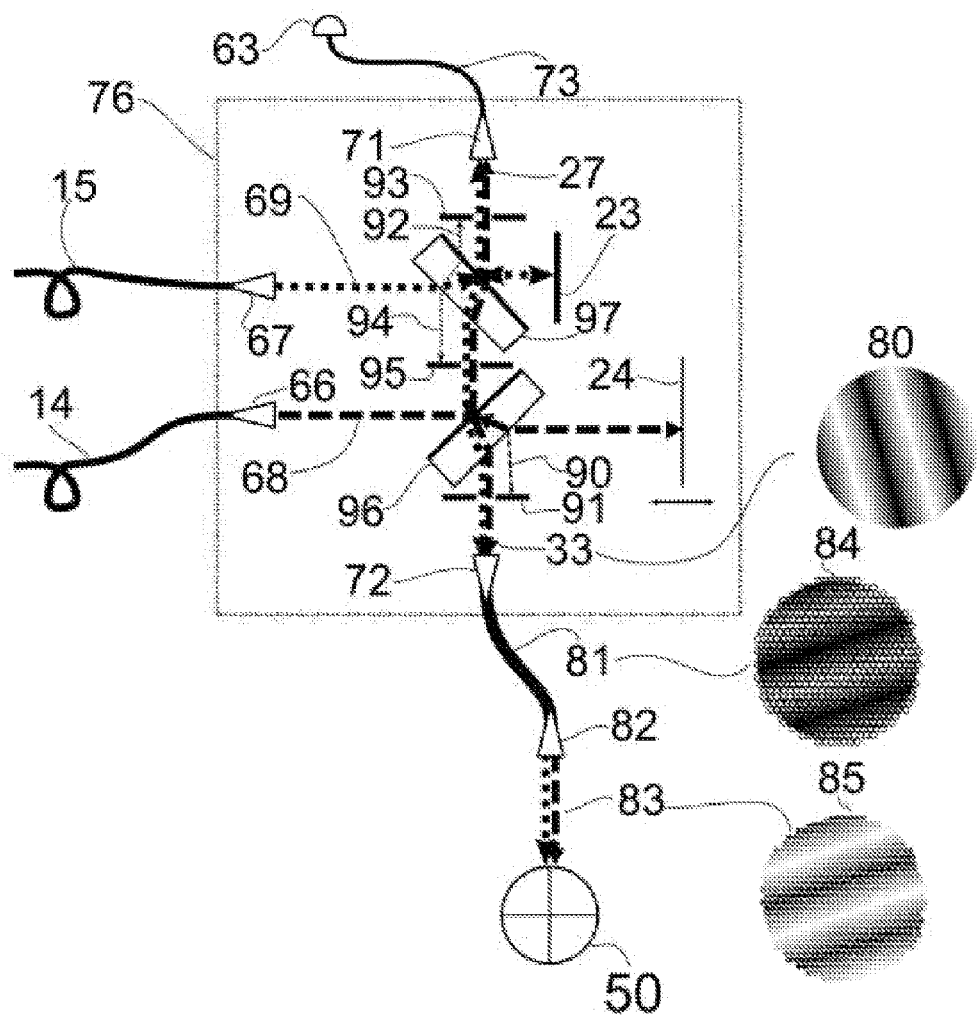
FIG. 10 is a schematic of the fiber-delivered and fiber-detected interferometer where the interferometer optics include plate beam splitters which are wedged to reduce ghost reflections received by the detectors.

FIG. 10 shows an example of a fiber coupled system 76 using plate beam splitters 96 and 97 to replace optical beam splitting element 59 as shown in FIG. 7. FIG. 10 is a schematic of a fiber-delivered and fiber-detected interferometer embodiment where the interferometer optics are composed of plate beam splitters 96 and 97 which are preferably wedged to reduce ghost reflections received by the detectors. The interferometer 76 can be remotely located depending on the length of the fiber components 14, 15, 73, and 81. Spurious reflections in the fiber coupled system 76 can be limited by using plate beam splitters 96 and 97 that are sufficiently wedged to eject spurious beams 90, 92, and 94 into apertures 91, 93, and 95, respectively that block the beams.

Figure 11:
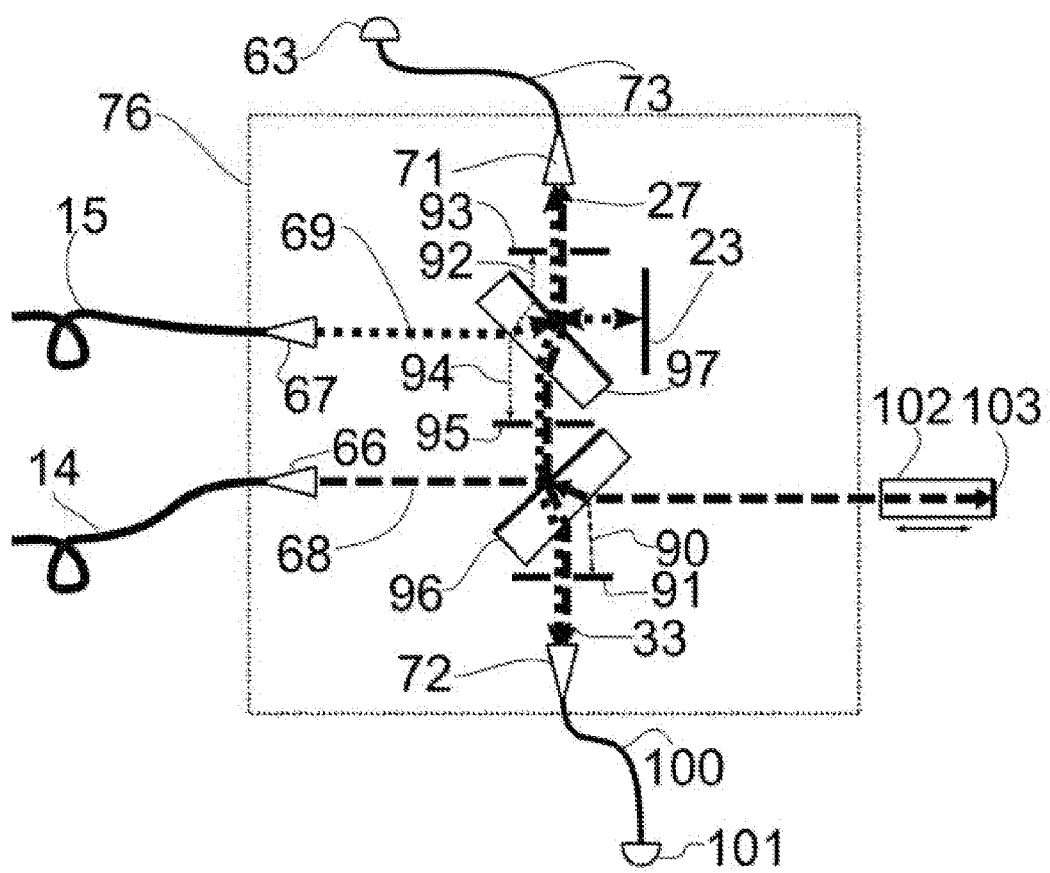
FIG. 11 is a schematic of the fiber-delivered and fiber-detected interferometer where the measurement mirror has been replaced with a gradient-index retroreflector which reduces the sensitivity of the interferometer to a single linear axis displacement.

FIG. 11 shows an example of a fiber coupled system 76, using a retroreflector 102 to replace the target mirror 24 as shown in FIG. 7. FIG. 11 is a schematic of a fiber-delivered and fiber-detected interferometer embodiment where the measurement mirror has been replaced with a gradient-index retroreflector to reduce the sensitivity to a single linear axis. The interferometer 76 can be remotely located depending on the length of the fiber components 14, 15, 73, and 81. The angular sensitivity of the interferometer 76 can be removed preferably by using a gradient-index retroreflector 102 with a highly reflective coating 103 or standard cube corner retroreflector (not shown). A gradient-index retroreflector 102 reflects light back to the interferometer 76 that is parallel to the input beam 68. When the input beam 68 is aligned to the center of the gradient-index retroreflector 102, the offset between the input beam 68 and reflected beam is minimal ensuring sufficient overlap for the measurement interference signal 33. This limits the effect of angular movement by the target on the measurement interference signal 33. Additionally, a standard optical fiber 100 can be used to transmit the measurement interference signal 33 to the fiber coupled detector 101 or free space detector (not shown).

As shown in FIG. 3, the optical paths in the interferometer 20 of beams A and B have the same length through the beam splitters, which minimizes errors due to global temperature changes. Referring to FIG. 4, the reference signal 27 is generated by splitting portions from both input beams A and B and interfering the split beam portions. The input beam B ($f_0+f_2+\theta_2$) is split equally at lower beam splitter 22. The reflected portion 31 of the beam B travels to upper beam splitter 21, where it interferes with a portion 25 of the beam A ($f_0+f_2+\theta_1$). The beam A is generated from the optical source, e.g., fiber 15 shown in FIG. 2, passes through the upper beam splitter 21, reflects off a reference mirror 23, and travels back to the beam splitter 21. Here it interferes with the beam B and is reflected toward reference detector 29 and further generates signal 57 which travels back down the path of input beam A. The reference interference signal 27 can be detected from either the top of the upper beam splitter 21, as shown in FIG. 4, or as signal 57 traveling back down the path from the input beam A which requires additional components. The reference detector 29 is used to convert the optical interference into a signal suitable for signal processing. The interference between the two beams A and B has the form $$I_r \propto \cos(2\pi(f_0+f_1)t+\theta_1)\cos(2\pi(f_0+f_2)t+\theta_2) \quad (1)$$

where $I_r$ is the reference irradiance. Ignoring the optical frequencies too fast to detect and assuming $f_1-f_2=f_s$, the reference irradiance simplifies to $$I_r \propto \cos(2\pi f_s t+\theta_1-\theta_2). \quad (2)$$

The measurement signal 33 is established in a similar manner. As shown in FIG. 5, the beam A from the input fiber 15 reflects off the beam splitter 21, travels to the lower beam splitter 22 where it interferes with the beam B. The beam B transmits through the beam splitter 22, reflects off a target mirror 24, and travels back to the beam splitter 22 where it interferes with the beam A. Like the reference signal 27, the interfered beams of the measurement signal 33 can be detected at the quadrant detector 50 (as shown in FIG. 5) or back down the path of input beam B as signal 58. Since the target mirror is sensitive to tip ($\alpha$), tilt ($\beta$), and changes in mirror position (z), a quadrant detector can be used to measure all three degrees of freedom with differential wavefront sensing in accordance with known techniques upon movement of the target mirror from one position to another position.

The quadrant detector is preferably composed of 4 individual photodiodes, where each photodiode detects the following signal $$I_{m1} \propto \cos(2\pi(f_0+f_1)t+\theta_1)\cos(2\pi(f_0+f_2)t+\theta_2+\theta_z+\phi_1) \quad (3)$$

$$I_{m2} \propto \cos(2\pi(f_0+f_1)t+\theta_1)\cos(2\pi(f_0+f_2)t+\theta_2+\theta_z+\phi_2) \quad (4)$$

$$I_{m3} \propto \cos(2\pi(f_0+f_1)t+\theta_1)\cos(2\pi(f_0+f_2)t+\theta_2+\theta_z+\phi_3) \quad (5)$$

$$I_{m4} \propto \cos(2\pi(f_0+f_1)t+\theta_1)\cos(2\pi(f_0+f_2)t+\theta_2+\theta_z+\phi_4) \quad (6)$$

Where $I_{m1}$, $I_{m2}$, $I_{m3}$, and $I_{m4}$ are the four individual measurement irradiances from photodiode quadrants 1-4, $\theta_z$ is the phase change due to the target mirror moving, and $\phi_1$ through $\phi_4$ are the phase changes due to target tip and tilt movement. Like the reference irradiance, Equations (3)-(6) can be simplified to $$I_{m1} \propto \cos(2\pi f_s t + \theta_1 - \theta_2 - \theta_z - \phi_1) \quad (7)$$

$$I_{m2} \propto \cos(2\pi f_s t + \theta_1 - \theta_2 - \theta_z - \phi_2) \quad (8)$$

$$I_{m3} \propto \cos(2\pi f_s t + \theta_1 - \theta_2 - \theta_z - \phi_3) \quad (9)$$

$$I_{m4} \propto \cos(2\pi f_s t + \theta_1 - \theta_2 - \theta_z - \phi_4) \quad (10)$$

Using known techniques, the phase difference between each measurement channel from the quadrant photodiode (Eqns 7-10) can be measured relative to the reference signal (Eqn 2). This yields 4 measured phase values $$\Theta_1 = \text{angle}(I_r, I_{m1}) = (\theta_1 - \theta_2) - (\theta_1 - \theta_2 - \theta_z - \phi_1) = \theta_z + \phi_1, \quad (11)$$

$$\Theta_2 = \text{angle}(I_r, I_{m2}) = (\theta_1 - \theta_2) - (\theta_1 - \theta_2 - \theta_z - \phi_2) = \theta_z + \phi_2, \quad (12)$$

$$\Theta_3 = \text{angle}(I_r, I_{m3}) = (\theta_1 - \theta_2) - (\theta_1 - \theta_2 - \theta_z - \phi_3) = \theta_z + \phi_3, \quad (13)$$

$$\Theta_4 = \text{angle}(I_r, I_{m4}) = (\theta_1 - \theta_2) - (\theta_1 - \theta_2 - \theta_z - \phi_4) = \theta_z + \phi_4, \quad (11)$$

The measured phase can be converted to displacement by knowing the phase relationship $$\Theta = \frac{2\pi N z n}{\lambda},$$

where N is the interferometer fold constant (2 in this case), n is the refractive index, and $\lambda$ is the wavelength of light. Similarly, the phase relationship can be expressed as $$\Theta = \frac{2\pi N n z f}{c},$$

where f is the optical frequency of the reference signal 25 that travels to the reference target 23 and measurement signal 36 that travels to the measurement target 24 and c is the speed of light. The absolute position is assumed to be known or not needed for calibrating and/or determining the motion of the measurement target. By tracking the phase change between the measurement interference signals and the reference interference signal, four different displacement values can be obtained. In the phase relationship $$\Theta = \frac{2\pi N n z f}{c},$$

z, n, and f are all functions of time. Thus, the measured position change (or displacement) $\Delta z_1$ detected by quadrant one 51 of the measurement quadrant detector 50 is $$\Delta z_1 = \frac{c \Delta \Theta_1}{2\pi N n f} - z \frac{\Delta n}{n} - z \frac{\Delta f}{f}, \quad (15)$$

where the $\Delta$'s represent values that change in time. Assuming reflective index fluctuations and optical frequency fluctuations are minimized, the measured position change $\Delta z_1$ detected by quadrant one 51 of the measurement quadrant detector is $$\Delta z_1 = \frac{c \Delta \Theta_1}{2\pi N n f}. \quad (16)$$

Similarly, the measured length changes at the three other quadrant diodes 52, 53, 54 are $$\Delta z_2 = \frac{c \Delta \Theta_2}{2\pi N n f}, \quad (17)$$

$$\Delta z_3 = \frac{c \Delta \Theta_3}{2\pi N n f}, \text{ and} \quad (18)$$

$$\Delta z_4 = \frac{c \Delta \Theta_4}{2\pi N n f}. \quad (19)$$

Thus, four different displacement values ($\Delta z_1$, $\Delta z_2$, $\Delta z_3$, and $\Delta z_4$) can be found from the change of each of the four phases, where displacement values are a function of displacement, tip, and tilt. Because of symmetry target displacement causes equal measured displacement changes in length change values in $\Delta z_1$, $\Delta z_2$, $\Delta z_3$, and $\Delta z_4$. Thus, the displacement of the measurement target can be determined by $$\Delta z = \frac{\Delta z_1 + \Delta z_2 + \Delta z_3 + \Delta z_4}{4}.$$

Likewise, the change in the tip direction can be determined by $$\Delta \alpha = \frac{\Delta z_1 + \Delta z_3 - \Delta z_2 - \Delta z_4}{L_\alpha},$$

where $L_\alpha$ is the length between the centroids of the detector in the tip axis or the spacing in the tip axis between the cores in a multicore fiber. Similarly, the change in tilt can be determined by $$\Delta \beta = \frac{\Delta z_1 + \Delta z_2 - \Delta z_3 - \Delta z_4}{L_\beta},$$

where $L_\beta$ is the length between the centroids of the detector in the tilt axis or the spacing in the tilt axis between the cores in a multicore fiber.

What is claimed is:
1. An interferometer comprising:
 a first beam splitter capable of splitting a first light beam having a first frequency;
 a second beam splitter rotated ninety degrees with respect to the first beam splitter and capable of splitting a second light beam having a second frequency;
 a reference mirror;
 a reference detector; and
 a measurement detector comprising a quadrant detector or a multi-core fiber with four detectors; wherein the first beam splitter is capable of a) transmitting a portion of the first light beam to the reference mirror and reflecting bad to the first beam splitter where a portion of the reflected first light beam is split and transmitted to the reference detector and a portion of the reflected first light beam is split and transmitted upstream in the first light beam and b) splitting a portion of the first light beam to the second beam splitter where a portion of the first light beam is split and transmitted to the measurement detector and a portion of the first light beam is split and transmitted upstream in the second light beam, and wherein the second beam splitter is capable of a) transmitting a portion of the second light beam to a measurement mirror and reflecting back to the second beam splitter where a portion of the reflected second light beam is split and transmitted to the measurement detector and a portion of the reflected second light beam is split and transmitted upstream in the second light beam and b) splitting a portion of the second light beam to the first beam splitter/here a portion of the second light beam is split and transmitted to the reference detector and a portion of the second light beam is split and transmitted upstream in the first light beam; and wherein the first light beam is spatially separated from the second light beam, the first and second frequencies having a different frequency, and the path of the first light beam through the first beam splitter is the same length as the path of the second light beam through the second beam splitter; and wherein the path of the first light beam transmitted from the first beam splitter to the reference detector and the path of the second light beam transmitted from the second beam splitter to the reference detector generate a reference interference signal that is detected at the reference detector and the path of the second light beam transmitted from the second beam splitter to the measurement detector and the path of the first light beam transmitted from the first beam splitter to the measurement detector generate a measurement interference signal that is detected at the measurement detector.

2. The interferometer of claim 1, further comprising a first light beam and a second light beam, wherein the first light beam and the second light beam are generated from a single light source.

3. The interferometer of claim 1, wherein the measurement detector converts the optical interference into a signal for measuring displacement.

4. The interferometer of claim 1, wherein the measurement detector converts the optical interference into a signal for measuring up to 3 degrees of freedom.

5. The interferometer of claim 1, further comprising a measurement mirror, wherein the measurement mirror comprises a gradient-index retroreflector.

6. The interferometer of claim 1, further comprising a measurement mirror, wherein the measurement mirror comprises a cube corner retroreflector.

7. The interferometer of claim 1, wherein each of the first and second beam splitters comprise a plate beam splitter.

8. The interferometer of claim 1, further comprising a fiber bundle in optical contact with the measurement detector.

9. An interferometer system comprising:
the interferometer of claim 1, and
a light source comprising a light beam separated by a beam splitter into two spatially separated beam paths, each beam path transmitted to a separate acousto-optic modulator, each acousto-optic modulator driven at a different frequency output and launched into respective optical fibers in optical communication with the interferometer.

10. The interferometer of claim 1, wherein at least one of the measurement interference signal is generated by a portion of the path of the first light beam in the path of a portion of the second light beam and the reference interference signal is generated by a portion of the path of the first light beam in the path of a portion of the path of the second light beam.

11. The interferometer of claim 1, wherein at least one of the measurement interference signal is generated by a portion of the path of the first light beam parallel to a portion the path of the second light beam and the reference interference signal is generated by a portion of the path of the first light beam parallel to a portion of the path of the second light beam.

12. The interferometer of claim 1, wherein the measurement detector converts the optical interference into a signal suitable for signal processing capable of measuring up to 3 degrees of freedom by determining the scaled phase difference between each quadrant.

13. A method of using an interferometer to measure a target moved from a first position to a second position, comprising:
directing a first light beam having a first frequency to a first beam splitter where a) a portion of the first light beam is transmitted to and reflects off a reference mirror back to the first beam splitter along the same path; and where a portion of the reflected first light beam is split and transmitted to a reference detector and a portion of the reflected first light beam is split and transmitted upstream in the first light beam and b) a portion of the first light beam is split and transmitted to a second beam splitter rotated ninety degrees with respect to the first beam splitter, where a portion of the split first light beam is split and transmitted to a measurement detector comprising a quadrant detector or a multi-core fiber with four detectors and a portion of the split first light beam is transmitted upstream in a second light beam;
directing the second light beam having a second frequency to the second beam splitter where a) a portion of the second light beam is transmitted through the second beam splitter to a measurement mirror of a target in a first position and reflecting back to the second beam splitter where a portion of the reflected second light beam is split and transmitted to the measurement detector and a portion of the reflected second light beam is split and transmitted upstream in the second light beam and b) a portion of the second light beam is split and transmitted to the first beam splitter where a portion of the split second light beam is split and transmitted to the reference detector and a portion of the split second light beam is transmitted upstream in the first light beam, wherein the first light beam is spatially separated from the second light beam, the first and second light beams have a different frequency, the path of the first light beam through the first beam splitter is the same length as the path of the second light beam through the second beam splitter, the path of the first light beam transmitted from the first beam splitter to the reference detector and the path of the second light beam transmitted from the second beam splitter to the reference detector creating a reference interference signal, and the path of the second light beam transmitted from the second beam splitter to the measurement detector and the path of the first light beam transmitted from the first beam splitter to the measurement detector creating a measurement interference signal;

detecting the reference interference signal at the reference detector and the measurement interference signal at the measurement detector for the target in the first position;

moving the target to a second position, detecting the reference interference signal at the reference detector and the measurement interference signal at the measurement detector for the target in the second position, and calculating the difference in at least one of the tilt, tip and displacement values of the target from the first and second positions.

14. The method of claim 13, wherein calculating the difference in at least one of the tilt, tip and displacement is determined by the scaled phase difference between each quadrant of the measurement detector.

15. The method of claim 13, wherein the measurement mirror comprises a retroreflector, the measurement interference signal is transmitted to the measurement detector through a fiber bundle, and the displacement between the first and second position is calculated.

16. The method of claim 15, wherein the retroreflector comprises a gradient-index or cube corner retroreflector.

17. The method of claim 13, further comprising providing a light source comprising a light beam separated by a beam splitter into two spatially separated beam paths, each beam path transmitted to a separate acousto-optic modulator, each acousto-optic modulator driven at a different frequency output and each light beam launched into respective optical fibers in optical communication with the interferometer.

18. The method of claim 13, wherein at least one of the measurement interference signal is generated by a portion of the path of the first light beam in the path of a portion of the second light beam and the reference interference signal is generated by a portion of the path of the first light beam in the path of a portion of the path of the second light beam.

19. The method of claim 13, wherein at least one of the measurement interference signal is generated by a portion of the path of the first light beam parallel to a portion the path of the second light beam and the reference interference signal is generated by a portion of the path of the first light beam parallel to a portion of the path of the second light beam.

* * * * *

UNITED STATES PATENT AND TRADEMARK OFFICE
CERTIFICATE OF CORRECTION

PATENT NO. : 9,518,816 B2
APPLICATION NO. : 14/361106
DATED : December 13, 2016
INVENTOR(S) : Jonathan D. Ellis and Josephus Wilhelmus Spronck It is certified that error appears in the above-identified patent and that said Letters Patent is hereby corrected as shown below:

In the Specification

Column 11, Line 2, replace "bad" with --back--.

Column 11, Line 19, replace "splitter/here" with --splitter where--.

In the Claims

Column 12, Lines 29-30, Claim 13, Lines 7-8, remove "along the same path".

Signed and Sealed this
Seventh Day of March, 2017

Michelle K. Lee
*Director of the United States Patent and Trademark Office*